Figure 1:
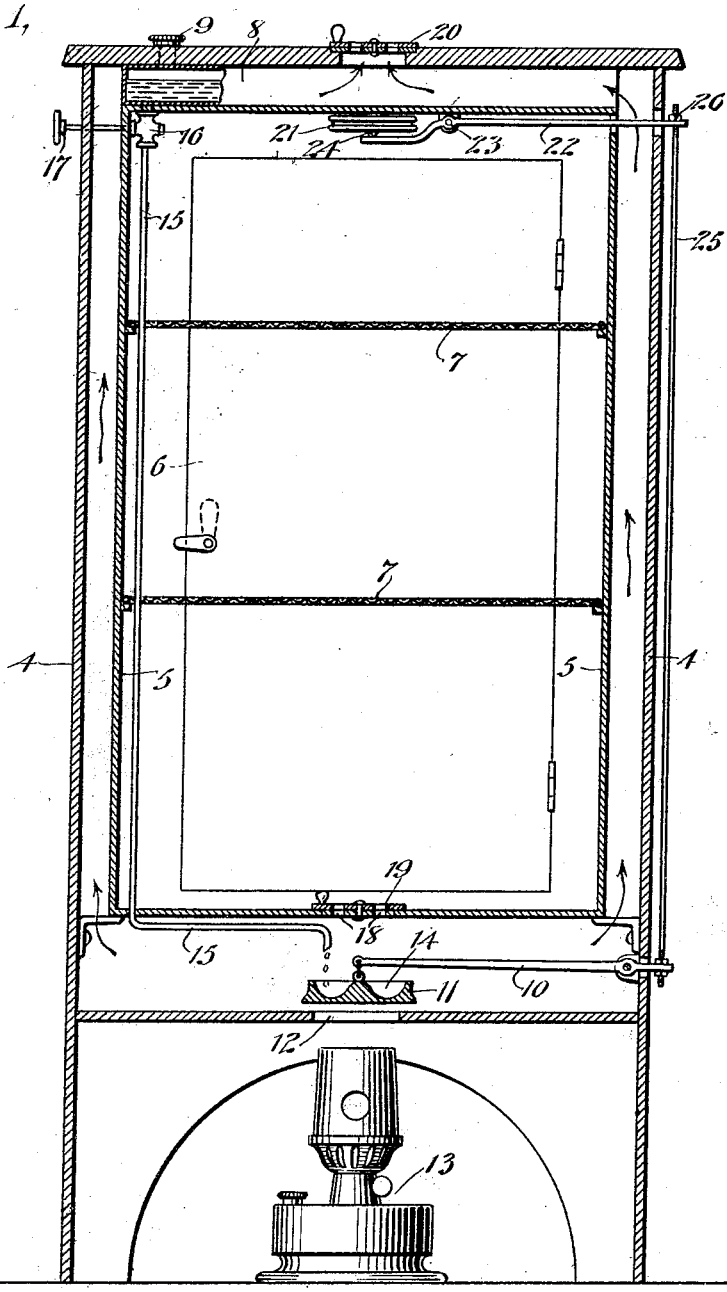

June 9, 1925. 1,541,673

J. A. VALENTA ET AL

HEATING CABINET

Filed March 11, 1924

WITNESSES:
Edw. Thorpe
E. L. Mueller

INVENTORS
J. A. Valenta
J. Kovar

BY Munn & Co.
ATTORNEYS

Patented June 9, 1925.

1,541,673

UNITED STATES PATENT OFFICE.

JOHN A. VALENTA AND JOE KOVAR, OF TAYLOR, TEXAS.

HEATING CABINET.

Application filed March 11, 1924. Serial No. 698,575.

*To all whom it may concern:*

Be it known that we, JOHN A. VALENTA and JOE KOVAR, citizens of the United States, and residents of Taylor, in the county of Williamson and State of Texas, have invented a new and Improved Heating Cabinet, of which the following is a full, clear, and exact description.

This invention relates to a heating cabinet, and has particular reference to means for regulating the temperature therein.

An object of the invention is to provide an improved cabinet which may be utilized for the preparation of various food products and in which the control of the heat in the cabinet is automatically regulated in a novel manner.

The above and other objects will appear more clearly from the following detailed description, when taken in connection with the accompanying drawing, which illustrates preferred embodiments of the inventive idea.

In the drawing—

Figure 2:
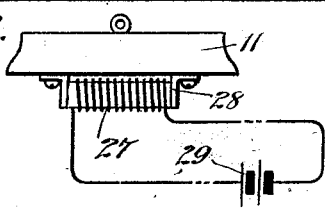

Figure 1 is a vertical longitudinal section through the cabinet illustrating the same in connection with one form of heating appliance, one end of the tank being broken out; and Figure 2 is a fragmentary side elevation illustrating the application of a different form of heating appliance to the cabinet.

The cabinet, which may be used as a fermenter and for the preparation of various food products, such as the making of dough for bread and the like, is shown as comprising an outer casing 4 in which is supported in any suitable manner an inner casing 5 arranged in spaced relation with respect to the walls of the cabinet and having a door 6 in the front thereof through which access is obtained to the interior of the inner casing. Shelves 7 are provided for dividing the inner casing into a plurality of compartments. The inner casing has mounted upon the top thereof and adjacent front wall of the outer casing 4 a small tank 8 which is designed to contain water for a purpose which will presently be described, the tank being filled through the inlet 9 extending through the outer casing 4.

Pivoted adjacent the bottom of the outer casing is a lever 10, the short end of which projects through said casing while the inner end supports a damper 11 suspended directly over an opening 12 formed in the bottom of the casing 4. The damper 11 is normally supported above and away from the bottom wall of casing 4, and is utilized to control the opening and closing of the opening 12 so as to regulate the amount of heat passing into the outer casing 4 and around the inner casing 5 from a heating unit, such as a lamp 13 as illustrated in Figure 1. The control of the damper will presently be described. The upper surface of the damper is reduced to form a recess 14 above which is suspended the lower end of a feed pipe 15 which extends upwardly through the inner casing and is connected at its upper end to the tank 8, from which water is fed downwardly through the pipe 15 and into the recess 14 of the damper. This feed is controlled by means of any suitable valve 16 located in the pipe 15 and operated by a handle 17. When the cabinet is in use the valve 16 is turned to regulate the flow of water from the tank 8 to the recess 14 in the damper in accordance with the amount of vapor which it is desired to create in the casing 4, a portion of said vapor being permitted to pass into the inner casing through openings 18 in the bottom of the latter casing, which openings are controlled by the rotatable plate or damper 19. When the damper 11 is in its raised position, as shown in Figure 1, the heat from the lamp 13 will pass into the space between the outer and inner casings and thus properly heat the inner casing and thereby control the temperature in the various compartments therein. The top of the outer casing 4 is also provided with a damper 20 for controlling the heat within the cabinet, said damper being capable of adjustment to an open position to permit of the egress of heat from the compartment whenever desired.

The invention further includes a thermostatic control mechanism for adjusting the position of the damper 11 with respect to the opening 12. This mechanism includes a thermostatic device 21 supported by the top of the inner casing 5 and, therefore, directly affected by the heat within said inner casing. A lever 22 is pivoted at 23 to the top of the casing and one end is engaged with a projection 24 on the device 21 so that the lever 22 will be rocked about its pivot when the device 21 is expanded and contracted. The lever 22 projects through openings formed in the inner and outer casings and is adjustably connected to the upper end of a rod 25 the lower end of which is secured to the projecting end of the lever 10. The upper end of the rod 25 is screw threaded and a nut 26 is utilized to adjust the position of the lever 22 so as to regulate its movement in accordance with the expansion and contraction of the device 21. It will be obvious from the foregoing that when the device is expanded under the influence of heat in the cabinet the outer end of the lever 22 will be raised exerting a pull upon the rod 25 and thereby forcing the inner end of the lever 10 downwardly to move the damper 11 toward the opening 12 in the bottom of the outer casing and thus reduce the amount of heat passing into the cabinet.

In the form of the invention shown in Figure 2, a different kind of heating element is employed. In this instance an electrical heating unit 27 in the form of a coil is detachably secured to the bottom of the damper 11 by means of suitable brackets 28 and said heating unit is connected in circuit with a suitable battery 29 which supplies current to the heating unit. This heating unit is used in place of the lamp 13 and the operation of the mechanism is the same as previously described.

What is claimed is:

1. In a heating cabinet, outer and inner spaced casings each having heat inlet openings, a damper controlling the opening in the outer casing, a liquid supply tank in said cabinet, means for controlling the flow of liquid from said tank to said damper, and a heating element located beneath said damper to vaporize the liquid fed to said damper from said tank and to supply heat to the inner casing through the opening therein.

2. In a heating cabinet, outer and inner spaced casings each having heat inlet openings, a damper controlling the opening in the outer casing, a liquid supply tank in said cabinet, means for controlling the flow of liquid from said tank to said damper, a heating element located beneath said damper to vaporize the liquid fed to said damper from said tank and to supply heat to the inner casing through the opening therein, and a thermostatic control mechanism for regulating the position of said damper with respect to the opening in said outer casing.

3. In a heating cabinet, outer and inner spaced casings each having heat inlet openings, a damper controlling the opening in the outer casing, a liquid supply tank in said cabinet, means for controlling the flow of liquid from said tank to said damper, a heating element located beneath said damper to vaporize the liquid fed to said damper from said tank and to supply heat to the inner casing through the opening therein, a thermostatic device in said inner casing, a lever controlled by said device, a second lever connected to said damper, and a connection between said levers for imparting movement to said damper as said thermostatic device is operated.

JOHN A. VALENTA.
JOE KOVAR.